US011843447B2

(12) United States Patent
Wang et al.

(10) Patent No.: US 11,843,447 B2
(45) Date of Patent: Dec. 12, 2023

(54) INTERFERENCE COORDINATION FOR 5G FLIGHT COMMUNICATION

(71) Applicant: AERO5G, INC., Poway, CA (US)

(72) Inventors: Jun Wang, Poway, CA (US); Bin Liu, Poway, CA (US)

(73) Assignee: AERO5G, INC., Poway, CA (US)

( * ) Notice: Subject to any disclaimer, the term of this patent is extended or adjusted under 35 U.S.C. 154(b) by 256 days.

(21) Appl. No.: 17/290,183

(22) PCT Filed: Jan. 8, 2020

(86) PCT No.: PCT/US2020/012805
§ 371 (c)(1),
(2) Date: Apr. 29, 2021

(87) PCT Pub. No.: WO2020/146545
PCT Pub. Date: Jul. 16, 2020

(65) Prior Publication Data
US 2021/0376913 A1    Dec. 2, 2021

Related U.S. Application Data

(60) Provisional application No. 62/789,918, filed on Jan. 8, 2019.

(51) Int. Cl.
*H04B 7/185*   (2006.01)
*H04W 72/20*   (2023.01)
*H04W 72/54*   (2023.01)

(52) U.S. Cl.
CPC ........ *H04B 7/18506* (2013.01); *H04W 72/20* (2023.01); *H04W 72/54* (2023.01)

(58) Field of Classification Search
CPC ... H04B 7/18506; H04W 72/20; H04W 72/54
USPC ........ 370/315, 329, 328, 338, 341, 345, 350
See application file for complete search history.

(56) References Cited

U.S. PATENT DOCUMENTS

| | | | |
|---|---|---|---|
| 2003/0016770 A1* | 1/2003 | Trans | H04B 3/32 375/346 |
| 2007/0135051 A1 | 6/2007 | Zheng | |
| 2014/0206367 A1* | 7/2014 | Agee | H04W 28/0236 455/450 |
| 2016/0232489 A1* | 8/2016 | Skaaksrud | G06Q 10/0836 |
| 2016/0381596 A1* | 12/2016 | Hu | H04W 28/0268 370/236 |
| 2017/0295069 A1 | 10/2017 | Sweet, II et al. | |
| 2017/0324463 A1 | 11/2017 | Jalali | |

* cited by examiner

*Primary Examiner* — Nghi H Ly
(74) *Attorney, Agent, or Firm* — CP LAW GROUP PC; Cy Bates

(57) ABSTRACT

Systems and methods are provided for achieving interference coordination for 5G flight communication. That is, systems and methods are disclosed that improve QoS by implementing interference coordination between nodes, wherein one of the nodes is optimized for flight communication.

18 Claims, 5 Drawing Sheets

| (FgNBi,GgNBj) | Tx beam 0 | ... | Tx beam K | Rx beam 0 | ... | Rx beam L |
|---|---|---|---|---|---|---|
| Tx beam 0 | High | | Low | Low | | Medium |
| ... | ... | | ... | ... | | ... |
| Tx beam N | Medium | | High | Low | | High |
| Rx beam 0 | Low | | Low | High | | Medium |
| ... | ... | | ... | ... | | ... |
| Rx beam M | Medium | | High | Low | | Medium |

| (FgNBi,GgNBj) | Tx beam 0 | ... | Tx beam K | Rx beam 0 | ... | Rx beam L |
|---|---|---|---|---|---|---|
| Tx beam 0 | High | | Low | 0 | | 0 |
| ... | ... | | ... | ... | | ... |
| Tx beam N | Medium | | High | 0 | | 0 |
| Rx beam 0 | 0 | | 0 | High | | Medium |
| ... | ... | | ... | ... | | ... |
| Rx beam M | 0 | | 0 | Low | | Medium |

| Information Elements | Note |
|---|---|
| PDU Type | |
| Cell ID | |
| Scheduled transmission time | e.g. slot number |
| List of PDCCH | List of PDCCH channels |
| >PDCCH container | The information transmitted on PDCCH |

INTERFERENCE COORDINATION FOR 5G FLIGHT COMMUNICATION

CROSS-REFERENCE TO RELATED APPLICATIONS

This application a 371 of PCT Ser. No. PCT/US20/12805, filed Jan. 8, 2020; which claims benefit of priority with provisional application Ser. No. 62/789,918, filed Jan. 8, 2019; the entire contents of each of which is hereby incorporated by reference for all purposes.

TECHNICAL FIELD

This invention relates to wireless communication; and more particularly, to systems and methods for interference coordination for use with 5G flight communication.

BACKGROUND

With the advent of 5G wireless communication comes a need for improved systems and methods for, inter alia, improving quality of service (QoS) and other performance metrics on 5G wireless networks. Of particular relevance is a need for improved interference coordination between nodes involved in 5G flight communication, including nodes that service 5G wireless signals to aircraft and nodes that neighbor such cells.

For example, the ground footprint 121 of a gNB optimized for flight communication (herein referred to as a "flight communication node" or "FgNB 120") can be quite large, usually much larger than a corresponding footprint 131 of a regular 4G/5G cell ("gNB 130"). In addition, the flight user equipment ("FUE 102") may also be configured to send signals, including uplink ("UL") and downlink ("DL") signals, at relatively higher power compared to general (non-flight) user equipment ("UE 135"). In the shared frequency deployment, the high-power nodes can cause interference to the communication of other lower-power nodes and/or UE, which is often ground-based, as shown in FIGS. 1-2. Also depicted in FIGS. 1-2 is the aircraft 101 onboard which the FUE 102 is housed, and an access point 103 (which may be integrated within or coupled to the FUE) and in-flight user equipment 110a; 110b, respectively.

The interference may take the form of same-link interference, such as uplink-uplink ("UL-UL") or downlink-downlink ("DL-DL") interference as shown in FIG. 1, or as cross-link interference, such as uplink-downlink ("UL-DL"), or downlink-uplink ("DL-UL") interference as shown in FIG. 2.

In UL-UL interference, the uplink signals that the FUE sends to the FgNB may bring interferences to the gNBs of the neighbor cells (any cell disposed within the footprint of the FgNB). In DL-DL interference, the downlink signals the FgNB sends to the FUE may bring interferences to the UEs in a neighbor cell.

Alternatively, or in addition to the same-link interference as described above, the cross-link interference may exist when different nodes apply different DL and UL configurations. Specifically, the FgNB needs to configure a larger switching guard period to account for larger timing advance (TA) associated with larger cell size, while the ground gNB without flight UE support (hereinafter, "neighbor gNB" or "neighbor communication node") may only require smaller guard period and may desire more switching points to support faster turnaround. The non-aligned DL and UL configurations across FgNB and neighbor gNB may introduce cross-link interference as shown in FIG. 2.

In UL-DL interference, the uplink signals that the FUE sends to the FgNB may bring interferences to the UE in the neighbor cell. In DL-UL interference, the downlink signals that the FgNB sends to the FUE may bring interferences to the gNB of the neighbor cells.

These and other problems and limitations require novel solutions and implementations for advancing 5G communication, in particular for advancing 5G flight communication.

SUMMARY OF INVENTION

Technical Problem

In accordance with the background as described above, current implementations of wireless communication are limited with respect to 5G flight communication, including, without limitation, interference caused between actors in a given 5G wireless network that includes at least one flight communication node.

Solution to Problem

Proposed herein are systems and methods for achieving interference coordination for 5G flight communication. That is, systems and methods are disclosed that improve QoS by implementing interference coordination between nodes, wherein one of the nodes is optimized for flight communication.

Forming a meaningful aspect of the proposed interference coordination are the features of: (i) generating interference information, the interference information comprising an interference measurement associated with each of a plurality of node combinations and beam configurations thereof, wherein each of said plurality of node combinations comprises a combination of: a flight communication node and one of a plurality of neighbor communication nodes; (ii) selecting a beam mode from a plurality of possible transmit and receive beam modes for transmitting or receiving a signal at the flight communication node based on the interference information; and (iii) communicating a load information message to the plurality of neighbor communication nodes, wherein the load information message comprises: beam mode indication, direction of arrival indication, uplink interference overload indication, uplink high interference indication, or a combination thereof.

In a first aspect, resource coordination is achieved via backhaul. For example, some features may comprise: generation of interference information corresponding to nodes across the 5G network; the network may configure UE to perform measurements on specific resources and provide a measurement report; the network may implement load information message exchange and updates; and the load information message exchange and update across gNBs can be specified in standards.

In another aspect, over the air (OTA)-based dynamic resource coordination may be implemented over the 5G network. Here, OTA-based dynamic coordination requires standards change on signaling to determine the dynamic resource activity. The gNB and UE function with respect to the OTA based activity signal detection.

In yet another aspect, interference cancelation may be implemented. For example, the network may be configured to implement scheduling information exchange; the scheduling information exchange across gNBs can be specified in standards; and the scheduling information passing from gNB to UE can also be specified in standards.

Moreover, interference coordination can be implemented over fronthaul interface. For example, a new signaling message can be implemented over F1 interface for resource coordination; a new control protocol data unit (PDU) type can be implemented for F1-U and Xn-U user plane packets; a new Xn application protocol (XnAP) message can be implemented; information elements can be implemented in the new message; or a direct interface can be implemented between distributed units (DUs) for coordination.

Other features and aspects will be appreciated by one having skill in the art upon a thorough review of the instant disclosure.

Advantageous Effects of Invention

Interference coordination as described herein improves QoS on the 5G network, particularly with respect to 5G flight communication.

Generating interference information comprising: node, beam mode, and corresponding interference measurement as described herein allows for, among other things, selection of a beam mode, from a plurality of possible beam modes, for transmitting and/or receiving signals at network nodes and user equipment, such as, without limitation, a flight communication node or flight user equipment. The interference information can be generated by any entity on the network, including the flight communication node, other node, or non-node device coupled to the network, such as, for example, an aero communication controller coupled to FgNB.

As many nodes and UEs on a 5G network currently or soon will implement beam forming antennas, it follows that selecting a beam mode for transmission and/or reception of signals is useful for mitigating interference. In this regard, using the interference information as described herein, the network or an entity thereof, can be enabled to select a beam mode from the plurality of possible beam modes for transmitting and/or receiving signals, wherein the selected beam mode may be one which provides the least or nullified interference between the flight communication node and neighbor nodes, the flight communication node and local UE (typically, but not necessarily, ground-based UE), the FUE and neighbor nodes, the FUE and local UE, or a combination thereof. An algorithm can be leveraged for selecting the optimal beam mode for transmitting and/or receiving signals at the nodes and UE on the 5G network.

Communicating load information, such as frequency, time, and particularly beam mode resources, to nodes on the 5G network, provides a novel platform for achieving resource reservation and interference coordination.

Other advantages will be appreciated by one having skill in the art upon a thorough review of the instant disclosure.

BRIEF DESCRIPTION OF DRAWINGS

The detailed description is described with reference to the accompanying figures of the drawings. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DESCRIPTION OF EMBODIMENTS

Figure 1:
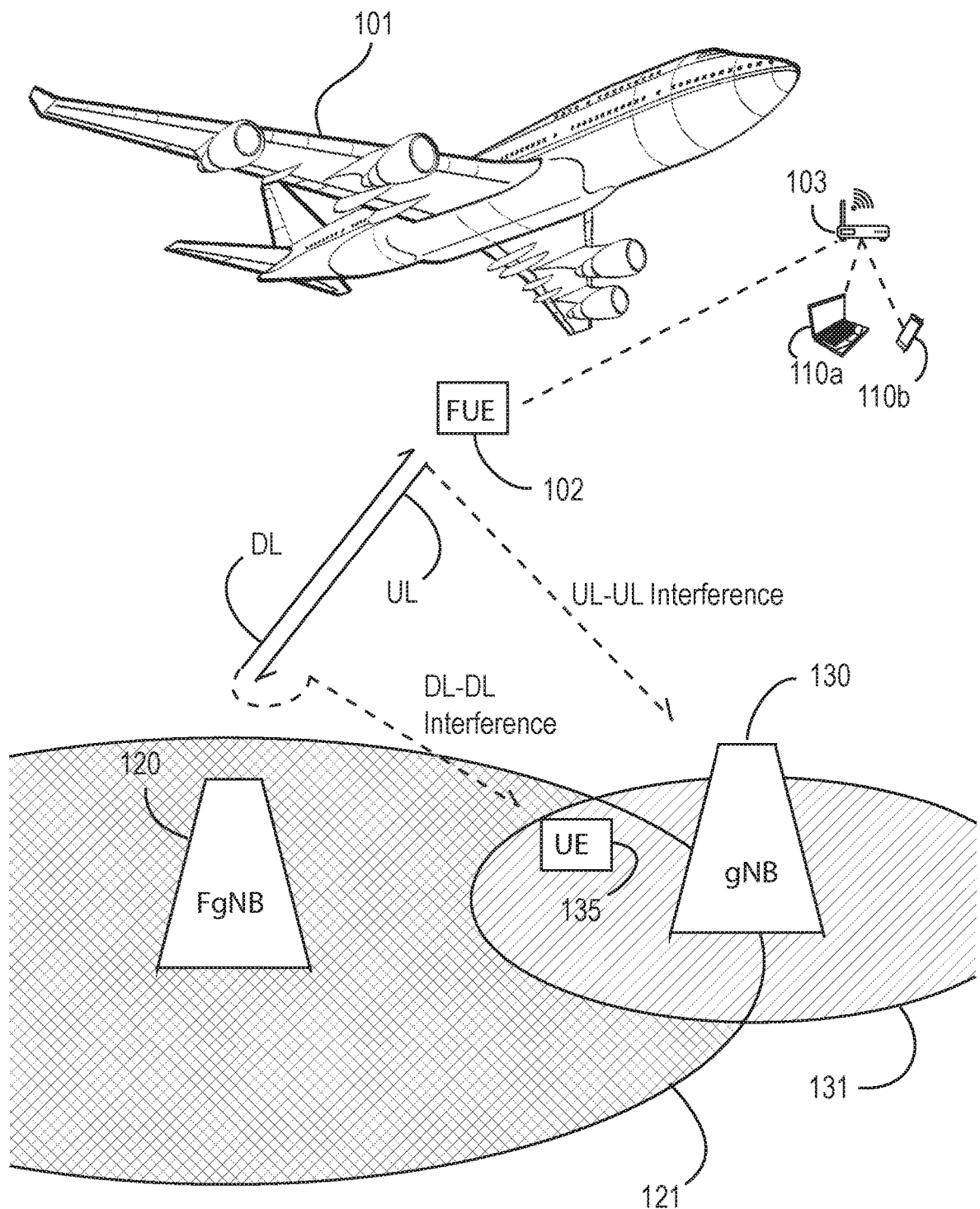
FIG. 1 shows a schematic representation of same-link interference in 5G flight communication.
Figure 2:
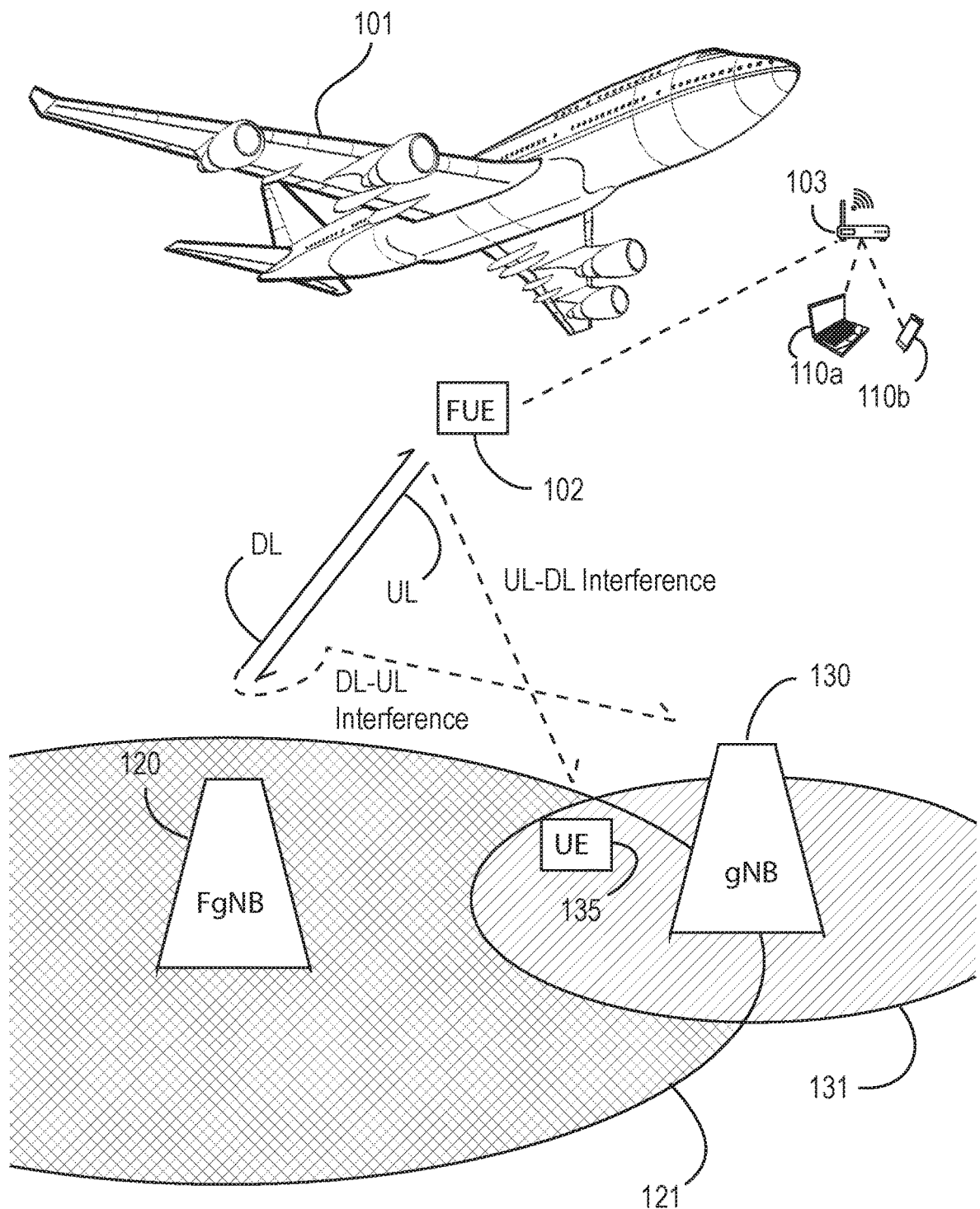
FIG. 2 shows a schematic representation of cross-link interference in 5G flight communication.

In the following description, for purposes of explanation and not limitation, details and descriptions are set forth in order to provide a thorough understanding of the embodiments of the invention. However, it will be apparent to those skilled in the art that the present invention may be practiced in other embodiments, including certain variations or alternative combinations that depart from these details and descriptions. The examples disclosed herein are intended to enable those with skill in the art to practice the invention, but such examples shall not reasonably be construed as limiting the spirit and scope of the invention as-claimed.

General Disclosures

Now, in accordance with a first embodiment, a method for attenuating interference associated with flight communication is provided, the method comprising: (i) generating interference information, the interference information comprising an interference measurement associated with each of a plurality of node combinations and beam configurations thereof, wherein each of said plurality of node combinations comprises a combination of: a flight communication node and one of a plurality of neighbor communication nodes; (ii) selecting a beam mode from a plurality of possible transmit and receive beam modes for transmitting or receiving a signal at the flight communication node based on the interference information; and (iii) communicating a load information message to the plurality of neighbor communication nodes.

Generating interference information may comprise: (i) configuring the flight communication node to transmit a signal in a first transmit beam mode of the plurality of possible transmit and receive beam modes; (ii) transmitting the signal from the flight communication node with the flight communication node configured in the first transmit beam mode; (iii) measuring the signal at each of the plurality of neighbor communication nodes, wherein said measuring the signal includes: for a plurality of receive beam modes of each respective neighbor communication node of the plurality of neighbor communication nodes, obtaining the corresponding interference measurement; (iv) optionally measuring the signal at each of a plurality of user equipment connected to the network; (v) repeating steps (i) thru (iii) and optionally (iv) for each subsequent transmit beam mode of the plurality of possible transmit and receive beam modes of the flight communication node; and (vi) storing the interference information in memory, wherein the interference information comprises a plurality of records, each record corresponding to one of the transmit beam modes, one of the neighbor communication nodes, one of the receive beam modes of the one of the neighbor communication nodes, and the corresponding interference measurement.

Alternatively, generating interference information may comprise: (i) requesting flight user equipment to transmit a signal to the flight communication node with the flight communication node being configured in a first receive beam mode of the plurality of possible transmit and receive beam modes; (ii) receiving the signal at the flight communication node with the flight communication node configured in the first receive beam mode; (iii) measuring the signal at each of the plurality of neighbor communication nodes, wherein said measuring the signal includes: for a plurality of receive beam modes of each respective neighbor communication node of the plurality of neighbor communication nodes, obtaining the corresponding interference measurement; (iv) optionally measuring the signal at each of a plurality of user equipment connected to the network; (v) repeating (i) thru (iii) and optionally (iv) for each subsequent receive beam mode of the plurality of possible transmit and receive beam modes of the flight communication node; and (vi) storing the interference information in memory, wherein the interference information comprises a plurality of records, each record corresponding to one of the transmit beam modes, one of the neighbor communication nodes, one of the receive beam modes of the one of the neighbor communication nodes, and the corresponding interference measurement.

For each of the plurality of node combinations and beam configurations thereof, said interference measurement may comprise one from the group consisting of: null-interference, low-interference, medium-interference, and high-interference.

Each of said plurality of beam configurations may individually comprise: one of: a transmit beam mode or receive beam mode of the flight communication node, and one of: a transmit beam mode or receive beam mode of the respective neighbor communication node.

The load information message may comprise: beam mode indication, direction of arrival indication, uplink interference overload indication; uplink high interference indication, or a combination thereof.

Additionally, or alternatively, the load information message may comprise: beam mode indication, direction of arrival indication, relative narrowband Tx power, or a combination thereof.

The method may further comprise the step of: requesting resource reservation based on the load information message, flight route associated with a flight user equipment, or a combination thereof.

In any of the embodiments herein, the load information message may further comprise: a timestamp, the timestamp indicating a time for which a resource partition takes effect according to the resource reservation, wherein the timestamp is based on the flight route associated with the flight user equipment.

The resource reservation may comprise: frequency domain, time domain, spatial domain, or a combination thereof.

In any of the embodiments herein, if all neighbor communication nodes are configured with the same time division duplex uplink and downlink configurations, then the method may further comprise: automatically setting crosslink interference in the interference information as 'null-interference', and measuring only same link interference for the plurality of node combinations and beam configurations thereof.

The invention may be embodied as a method for interference coordination for use with 5G flight communication, or a system configured to execute such method for interference coordination. Accordingly, the methods for attenuating interference associated with flight communication may be implemented as a computerized method embodied within a network entity or network structure. Additionally, or alternatively, the invention may be practiced as a physical entity with software embodied therein, wherein the software is configured to execute a method for attenuating interference associated with flight communication. In this regard, methods, systems configured to practice such methods, and hardware for installation in such systems that are configured to execute the methods, either alone or in combination with other hardware and software elements on a network, are hereby denoted as various aspects of the invention that are claimed herein, either expressly, or by equivalents.

Example 1

Interference Coordination—Resource Coordination Via Backhaul

In an embodiment, the flight communication node FgNB is configured to send signaling to gNBs of intra-frequency neighbors or "neighbor communication node(s)" to reserve resource or indicate resource utilization for flight UE communication. For example, without limitation, a signal such as an LTE X2AP load information message may be sent from the FgNB, with or without modification. The resource being reserved may include frequency domain, time domain and space domain, i.e. beam.

Figures 3, 4, 5:
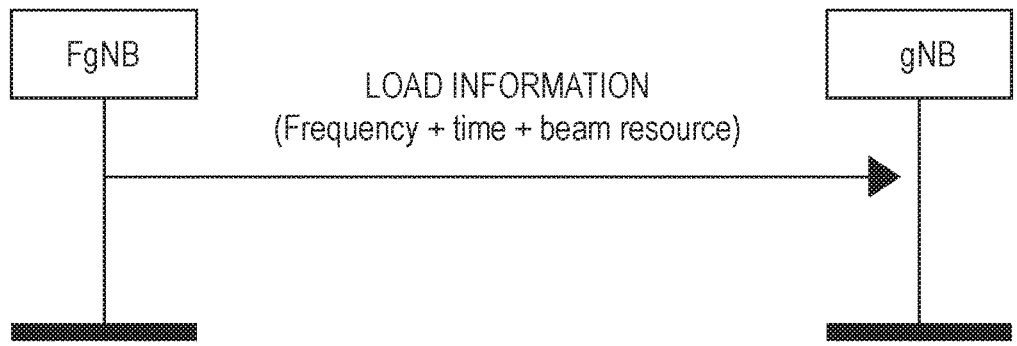
FIG. 3 shows a schematic representation of a solution for achieving interference coordination, the solution integrates semi-static resource coordination based on interference information that is deployed in backhaul.
FIG. 4 shows a first representative data table comprising interference information acquired with respect to a node combination ($FgNB_i$, $GgNB_j$), including interference measurement corresponding to each of a plurality of possible transmit and receive beam modes.
FIG. 5 shows a second representative data table comprising interference information acquired with respect to a node combination ($FgNB_i$, $GgNB_j$), including interference measurement corresponding to each of a plurality of possible transmit and receive beam modes, wherein cross-link interference is assumed to be "0" or "null".

FIG. 3 shows a schematic representation of a solution for achieving interference coordination, the solution integrates semi-static resource coordination based on interference information that is deployed in backhaul. Here, FgNB sends the load information message to gNB as shown.

The frequency resource can be indicated by physical resource block (PRB) list, similar to the "UL Interference Overload Indication" IE of X2AP (see, for example, section 9.2.17 of 3GPP TS 36.423).

The time domain resource can be indicated by subframe pattern, slot pattern or orthogonal frequency-division multiplexing (OFDM) symbol pattern. It can also be indicated as a time cycle parameter.

The frequency+time combination can be indicated by a bitmap, similar to X2AP "MeNB Resource Coordination Information" IE (see, for example, section 9.2.116 of 3GPP2 TS 36.423).

In 5G, the flight UE and flight gNB may be equipped with multiple beam forming antennas, or a single multi-mode beam forming antenna, and Tx and Rx beamforming can thus be applied to increase the flight communication coverage. Here, the interference coordination is configured to reduce the interference from beamformed transmission from FUE or flight gNB to the ground and other non-flight gNB and other non-flight UE; for example, in some cases there may be balloon hosted gNB or UE, or other non-ground and non-flight entities on the network.

This being understood, any embodiment herein which discloses ground communication node(s) or ground user equipment may be similarly practiced with other non-ground and non-flight (ex: balloon-hosted) network entities of similar purpose.

The interference coordination scheme can be implemented by generating interference information as described herein, to determine whether a given link transmission can cause interference to another link transmission. The resource partition is only applicable to the links with interference according to the interference information. More specifically, FgNB may transmit data to FUE with Tx beam 0. At the same time, a neighbor communication node gNB and/or local UE may measure the interference on multiple Rx beams to determine whether the Tx beam 0 from FgNB may cause interference on those receive beams. In this way, the interference information from a given Tx beam from FgNB to neighbor gNB and neighbor UE can be obtained. This process may be repeated for each Tx beam of a plurality of possible Tx beams of the FgNB.

In addition, FgNB may schedule data transmission from FUE and transmission needs to be received with Rx beam 1. At the same time, neighbor gNB and UE may measure the interference on multiple Rx beams to determine whether a given Rx beam suffers from interference when FgNB uses Rx beam 1 for reception. In this way, neighboring gNB may obtain the interference experienced on each Rx beam when FgNB receives on each Rx beam. Such operation can be carried for multiple neighbor gNBs and neighbor UEs around the FgNBs and FUEs which may be subject to the receiver interference to determine the potential interference information or the links which can coexist without causing too much interference.

The interference information can be measured based on reference signal (RS), or another signal detection metric, and updated semi-statically.

Since the UE may move from one location to another, a more efficient interference information can be based on the Tx and Rx beam from gNB (both FgNB and GgNB) perspective. In this regard, multiple levels of interference can be labeled to allow for more flexible interference coordination. For example, when the interfering level is medium, the communication link can coexist with proper link adaptation, such as reduced modulation and coding scheme (MCS) level.

FIG. 4 shows a first representative data table comprising interference information acquired with respect to a node combination (FgNB$_i$, GgNB$_j$), including interference measurement corresponding to each of a plurality of possible transmit and receive beam modes. It will be appreciated that interference measurement is provided for both same-link and cross-link interference.

When all gNBs within a footprint of the FgNB use the same time division duplex (TDD) DL and UL configurations, the interference information can be simplified to only reflect the same-link interference; that is, the entries corresponding to the cross-link interference are set to be "zero", "0", "null-interference" or similar value. In this regard, FIG. 5 shows a second representative data table comprising interference information acquired with respect to a node combination (FgNB$_i$, GgNB$_j$), including interference measurement corresponding to each of a plurality of possible transmit and receive beam modes, wherein cross-link interference is assumed to be "0" or "null".

The interference information may be provided as a matrix of data, a table, or embedded in code or otherwise configured in any computerized format that can be interpreted by the 5G network; i.e. computer-implemented.

The beam information may comprise the Tx and Rx beam configuration, direction of arrival (DOA) information, or a combination thereof. The DOA information may be indicated as a series for each time unit, e.g. DOA1, DOA2 . . . DOAn of each radio frame.

The serving FgNB can update the resource reservation by sending a load information message based on the FUE and its flight route in combination with the obtained interference information. Additionally, or alternatively, the load information can include a time stamp where the resource partition is to take effect based on FUE and its flight route in combination with the obtained interference information.

Example 2

Interference Coordination w/OTA-Based Dynamic Resource Coordination

One drawback with backhaul-based coordination is that it may have speed limitations and typically it needs to be conservative enough to accommodate the potential worst case.

For example, when the FUE is approaching, the resource partition can become effective, however, it is very well possible that the communication may not occupy all the partitioned resources, thus resulting into potential resource underutilization for ground and other non-flight communication.

Alternatively, the flight communication needs to reserve resource to the ground or other non-flight neighboring UE communication, however, there may not be any active ground or other non-flight neighboring UE transmission at that time, again resulting into resource underutilization for flight communication.

To achieve better resource utilization, an over-the-air (OTA)-based dynamic resource coordination can be applied on top of the semi-static coordination based on interference information as otherwise described herein. That is, one gNB may use the resources allocated to another gNB on the interfering link opportunistically when the other gNB is not using its allocated resources actively.

For example, when the resource partition takes effect based on FUE and flight route, flight communication node may want to use the resources allocated to its own use case in addition to the resources allocated to neighbor node communication.

To avoid potential interference, when the flight communication node wants to use the resources allocated to neighbor communication node(s), it needs to detect a signal every N slots where the signal can be a preamble, reference signal or control signaling (e.g., PDCCH). This activity signal (AS)

indicates the usage of the upcoming N slots and may be sent from either or both UEs and gNBs.

If the activity signal is not detected, it means that there is no active neighbor communication on those N slots, and the flight communication can use the resources allocated for neighbor communication for those N slots. The network can configure the N to minimize the system overhead and to allow for processing timeline for the signal detection.

To consider both the same-link and cross-link interference, both UEs and gNBs can listen to the activity signal from other gNBs when they intend to use resources allocated to the other gNBs, at least when they are on the interfering links in the interference information.

When all the gNBs use the same TDD DL and UL configurations, not only can the interference information be simplified to only reflect the same-link interference, but in addition, only gNBs need to listen to the activity signal from UEs (i.e., uplink) while only UEs need to listen to the activity signal from gNBs (i.e., downlink).

Figure 6:
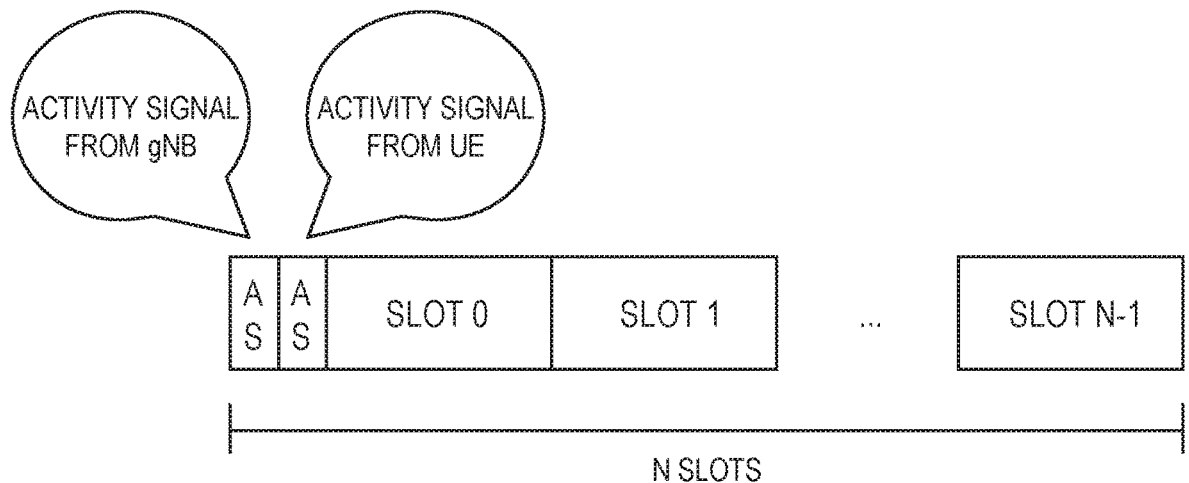
FIG. 6 shows a schematic representation of a solution for achieving over-the-air (OTA) dynamic resource coordination, in addition to semi-static resource coordination based on interference information, wherein an activity signal is provided for indicating usage of forthcoming N slots, and wherein the activity signal may be communicated from gNBs and/or UEs.

FIG. 6 shows a schematic representation of a solution for achieving over-the-air (OTA) dynamic resource coordination, in addition to semi-static resource coordination based on interference information, wherein an activity signal is provided for indicating usage of forthcoming N slots, and wherein the activity signal may be communicated from gNBs and/or UEs. Here, the N slots are preceded by an activity signal from gNB and an activity signal from UE.

Example 3

Interference Cancelation

Alternatively, or in addition to, the semi-static and dynamic interference coordination described in Examples 1 and 2, above, where a primary goal is to avoid or minimize the interference on the interfering links, another effective way to deal with potential interference is to apply advanced receiver processing; i.e., interference cancelation or joint detection.

To facilitate interference cancellation, some assistance information can be conveyed to the receiver.

The serving FgNB may send its scheduling information to the intra-frequency neighbor cells (neighbor communication nodes) to allow the neighbor cells to perform interference cancelation on their reception. The neighbor cells may also pass the assistance information to their UEs to perform interference cancelation on UEs' reception.

More specifically, FgNB may indicate the time and frequency allocation, MCS, rank, among other information, of its DL and/or UL transmission/scheduling of the FUE to neighbor gNB(s). The neighbor gNB(s) can each perform detection of their own UL transmission by canceling the FgNB or FUE's transmission, thereby detecting its own desired signal on the overlapping resources. The UEs served by neighbor gNB can also cancel the transmission from flight communication to enhance their receiver performance.

The interference cancelation can be carried out in modulation level or it can be done via decoding and re-encoding of the detected interference.

For UL interference from one UE served by FgNB to another UE served by another neighbor gNB, the neighbor gNB and FgNB can perform joint detection by exchanging the scheduling information with each other to allow for better interference suppression and cancelation.

Figure 7:
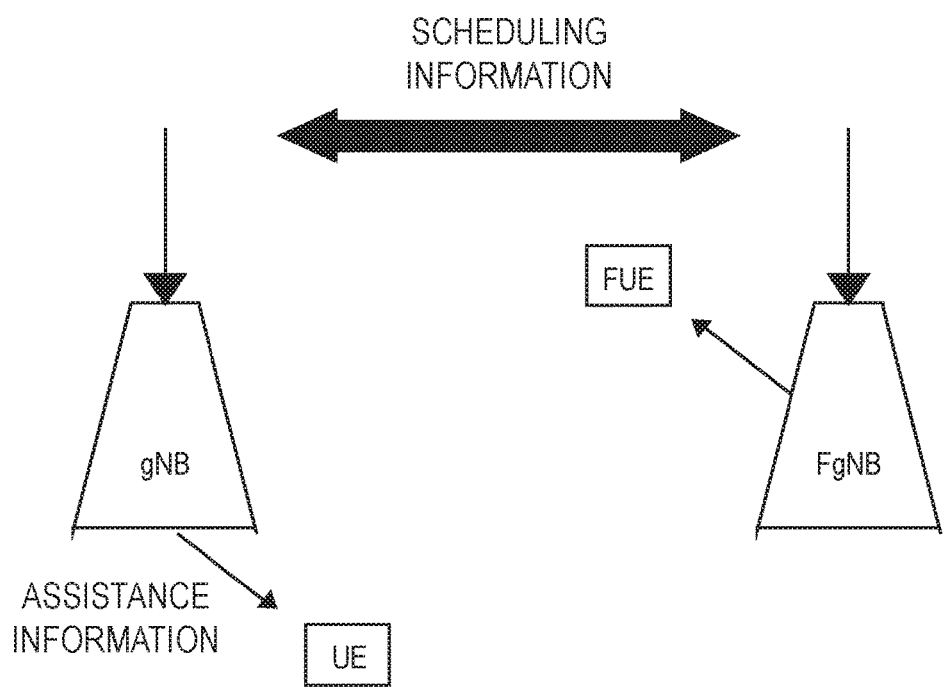
FIG. 7 shows a schematic representation of a solution for achieving interference coordination via interference cancelation or joint detection by exchanging scheduling information between a flight communication node and neighbor communication node(s).

FIG. 7 shows a schematic representation of a solution for achieving interference coordination via interference cancelation or joint detection by exchanging scheduling information between a flight communication node and neighbor communication node(s). Here, the system can be configured for interference cancellation and detection on interfering links.

Example 4

Coordination Information Over Fronthaul Interface

Figures 8, 9:
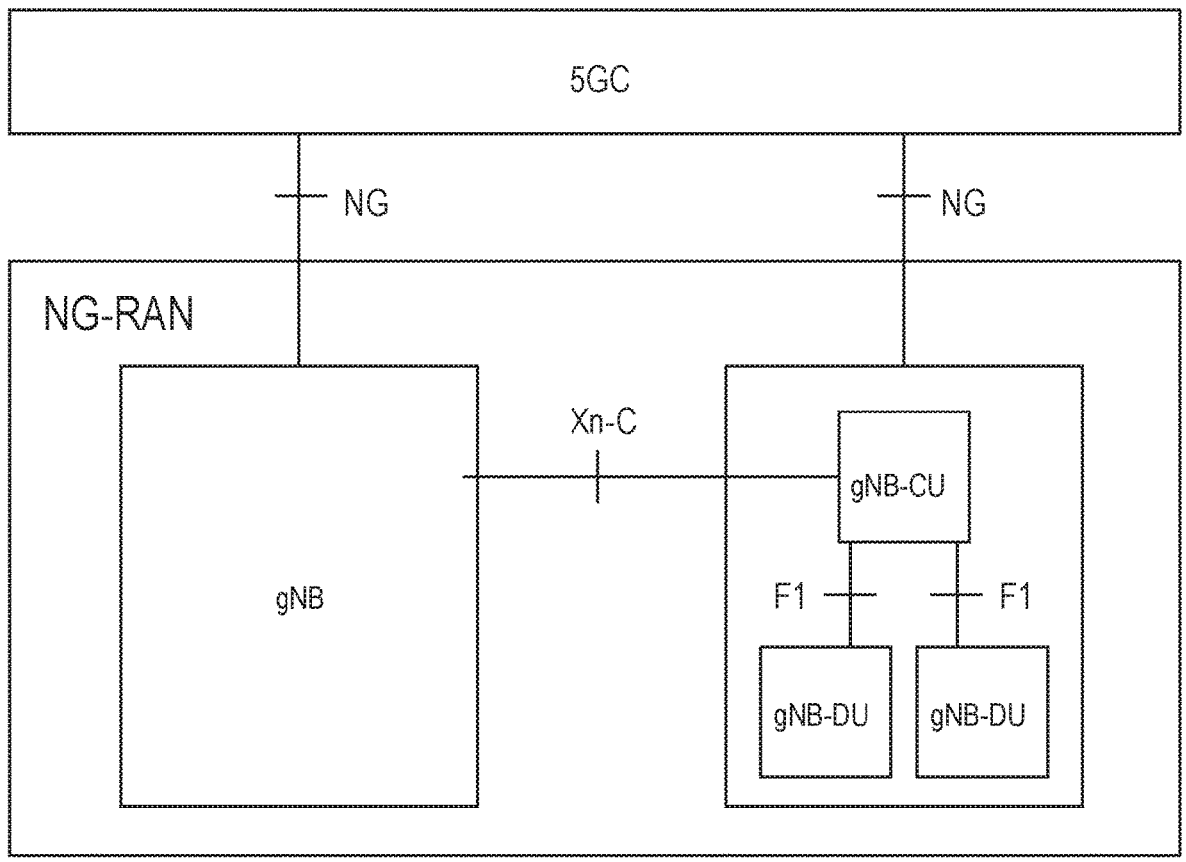
FIG. 8 shows NG-RAN architecture, including central unit and distributed unit structure.
FIG. 9 shows a table including information, such as, scheduling information, to be included in a proposed interference cancellation message.

In 5G, the gNB may be split into gNB-CU (central unit) and gNB-DU (distributed units), as described in 3GPP TS 38.401 and reproduced in FIG. 8. The fronthaul interface between CU and DU is referred to as "F1 interface". The low layer protocols (RLC/MAC/PHY) are supported by the DU. So, DU is the user of the backhaul coordination information. The resource coordination information should be relayed by CU.

With respect to that described in Examples 1 and 2, above, the load information procedures can be added on F1AP (See 3GPP TS 38.463), in addition to XNAP (See 3GPP TS 38.423). The F1AP load information message can include the frequency, time and beam coordination message by either a container (including the XNAP load information message) or separate information elements.

With respect to that disclosed in Example 3, above, the schedule information and assistance information may be delivered between: (i) DU and DU via CU; (ii) gNB and DU via CU; or gNB and gNB.

The information could be carried either over control plane (F1AP and XnAP) or user plane in the header of user plane PDU over F1/XN, see 3GPP TS 38.425. The interference cancellation information can be defined as a new message, e.g. scheduling information, including the information as illustrated in FIG. 9.

FIG. 9 shows a table including information, such as, scheduling information, to be included in a proposed interference cancellation message.

In addition, direct interface can also be defined between DUs to exchange the coordination information.

While a series of steps have been described in connection with the method 600, a fewer number of the described steps and/or additional steps may be performed. Furthermore, while the steps have been described in a particular order, the steps in method 600 may be performed in a different order.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

INDUSTRIAL APPLICABILITY

The invention applies to systems and methods for wireless communication.

REFERENCE SIGNS LIST aircraft 101
FUE 102
access point 103
in-flight user equipment 110a; 110b
flight communication node (FgNB 120)
FgNB footprint 121
Neighbor communication node (neighbor gNB 130)
neighbor gNB footprint 131
user equipment (UE 135)
uplink ("UL")
downlink ("DL")

What is claimed is:

1. A method for attenuating interference associated with flight communication, the method comprising:
generating interference information, the interference information comprising an interference measurement associated with each of a plurality of node combinations and beam configurations thereof, wherein each of said plurality of node combinations comprises a combination of: a flight communication node and one of a plurality of neighbor communication nodes;
selecting a beam mode from a plurality of possible transmit and receive beam modes for transmitting or receiving a signal at the flight communication node based on the interference information; and
communicating a load information message to the plurality of neighbor communication nodes.

2. The method claim 1, wherein said generating interference information comprises:
(i) configuring the flight communication node to transmit a signal in a first transmit beam mode of the plurality of possible transmit and receive beam modes;
(ii) transmitting the signal from the flight communication node with the flight communication node configured in the first transmit beam mode;
(iii) measuring the signal at each of the plurality of neighbor communication nodes, wherein said measuring the signal includes: for a plurality of receive beam modes of each respective neighbor communication node of the plurality of neighbor communication nodes, obtaining the corresponding interference measurement;
(iv) optionally measuring the signal at each of a plurality of user equipment connected to the network;
(v) repeating (i) thru (iii) and optionally (iv) for each subsequent transmit beam mode of the plurality of possible transmit and receive beam modes of the flight communication node; and
(vi) storing the interference information in memory, wherein the interference information comprises a plurality of records, each record corresponding to one of the transmit beam modes, one of the neighbor communication nodes, one of the receive beam modes of the one of the neighbor communication nodes, and the corresponding interference measurement.

3. The method of claim 2, wherein said generating interference information comprises:
(i) requesting flight user equipment to transmit a signal to the flight communication node with the flight communication node being configured in a first receive beam mode of the plurality of possible transmit and receive beam modes;
(ii) receiving the signal at the flight communication node with the flight communication node configured in the first receive beam mode;
(iii) measuring the signal at each of the plurality of neighbor communication nodes,
wherein said measuring the signal includes: for a plurality of receive beam modes of each respective neighbor communication node of the plurality of neighbor communication nodes, obtaining the corresponding interference measurement;
(iv) optionally measuring the signal at each of a plurality of user equipment connected to the network;
(v) repeating (i) thru (iii) and optionally (iv) for each subsequent receive beam mode of the plurality of possible transmit and receive beam modes of the flight communication node; and
(vi) storing the interference information in memory, wherein the interference information comprises a plurality of records, each record corresponding to one of the transmit beam modes, one of the neighbor communication nodes, one of the receive beam modes of the one of the neighbor communication nodes, and the corresponding interference measurement.

4. The method of claim 3, wherein
for each of the plurality of node combinations and beam configurations thereof, said interference measurement comprises one from the group consisting of: null-interference, low-interference, medium-interference, and high-interference.

5. The method of claim 4, wherein
each of said plurality of beam configurations individually comprises:
one of: a transmit beam mode or receive beam mode of the flight communication node, and
one of: a transmit beam mode or receive beam mode of the respective neighbor communication node.

6. The method of claim 5, wherein
said load information message comprises: beam mode indication, direction of arrival indication, uplink interference overload indication; uplink high interference indication, or a combination thereof.

7. The method of claim 6, wherein
said load information message comprises: beam mode indication, direction of arrival indication, relative narrowband Tx power, or a combination thereof.

8. The method of claim 7, further comprising:
requesting resource reservation based on the load information message, flight route associated with a flight user equipment, or a combination thereof.

9. The method, wherein
said load information message comprises: a timestamp, the timestamp indicating a time for which a resource partition takes effect according to the resource reservation, wherein the timestamp is based on the flight route associated with the flight user equipment.

10. The method of claim 9, wherein
said resource reservation comprises: frequency domain, time domain, spatial domain, or a combination thereof.

11. The method of claim 10, wherein
if all neighbor communication nodes are configured with the same time division duplex uplink and downlink configurations, then
automatically setting crosslink interference in the interference information as 'null-interference', and
measuring only same link interference for the plurality of node combinations and beam configurations thereof.

12. The method of claim 11, further comprising:
at one or more of: the flight communication node, the plurality of neighbor communication nodes, and the user equipment served by the flight communication node or neighbor communication nodes,
listening for an activity signal embedded in each of a plurality of radio frames communicated over time, and
if no activity signal is detected in one of the radio frames, then
with one of: the flight communication node, the plurality of neighbor communication nodes, and the user equipment,
utilizing network resources allocated to another of the flight communication node, the plurality of neighbor communication nodes, and the user equipment within the radio frame.

13. The method of claim 12, wherein the activity signal is embedded in a preamble, reference signal, or control signal.

14. The method of claim 13, wherein
if all neighbor communication nodes are configured with the same time division duplex uplink and downlink configurations, then
automatically setting crosslink interference in the interference information as 'null-interference',
measuring only same link interference for the plurality of node combinations and beam configurations thereof,
listening for said activity signal only at the flight communication node and the plurality of neighbor communication nodes in uplink transmissions, and
listening for said activity signal only at the user equipment served by the neighbor communication nodes in downlink transmissions.

15. The method of claim 14, further comprising:
serving scheduling information from the flight communication node to the plurality of neighbor communication nodes; and
performing interference cancelation at one or more of the neighbor communication nodes based on the scheduling information.

16. The method of claim 14, further comprising:
serving scheduling information from the flight communication node to the plurality of neighbor communication nodes;
communicating assistance information between the neighbor communication nodes and the user equipment connected therewith; and
performing interference cancelation at one or more of the neighbor communication nodes and user equipment connected therewith based on the scheduling information.

17. The method of claim 14, further comprising:
performing joint detection of scheduling information between the flight communication node and the plurality of neighbor communication nodes located;
performing interference cancelation at one or more of the flight communication node, the neighbor communication nodes and user equipment connected therewith based on the scheduling information.

18. The method of claim 7, further comprising:
performing interference coordination with disaggregated communication nodes; and
exchanging interference coordination information between distributed units of disaggregated communication nodes and a central unit of the dis-aggregated communication nodes.

* * * * *